United States Patent
McCrary et al.

(10) Patent No.: US 10,180,789 B2
(45) Date of Patent: Jan. 15, 2019

(54) SOFTWARE CONTROL OF STATE SETS

(71) Applicant: Advanced Micro Devices, Inc., Sunnyvale, CA (US)

(72) Inventors: Rex Eldon McCrary, Oviedo, FL (US); Michael J. Mantor, Orlando, FL (US); Alexander Fuad Ashkar, Winter Park, FL (US); Harry J. Wise, Chuluota, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 112 days.

(21) Appl. No.: 15/417,011

(22) Filed: Jan. 26, 2017

(65) Prior Publication Data

US 2018/0210657 A1 Jul. 26, 2018

(51) Int. Cl.
*G06F 12/00* (2006.01)
*G06F 3/06* (2006.01)
*G06F 9/48* (2006.01)
*G06F 9/50* (2006.01)

(52) U.S. Cl.
CPC ............ *G06F 3/0607* (2013.01); *G06F 3/065* (2013.01); *G06F 3/067* (2013.01); *G06F 3/0619* (2013.01); *G06F 3/0634* (2013.01); *G06F 9/4881* (2013.01); *G06F 9/50* (2013.01)

(58) Field of Classification Search
CPC .... G06F 3/0607; G06F 3/0619; G06F 3/0634; G06F 3/065; G06F 3/067; G06F 9/4881; G06F 9/50; G06F 9/461; G06F 9/462; G06F 9/45533

See application file for complete search history.

(56) References Cited

U.S. PATENT DOCUMENTS

| | | |
|---|---|---|
| 5,555,414 A | 9/1996 | Hough et al. |
| 5,826,084 A | 10/1998 | Brooks et al. |
| 6,230,259 B1 * | 5/2001 | Christie .............. G06F 9/30138 712/228 |
| 6,785,886 B1 | 8/2004 | Lim et al. |
| 7,937,700 B1 | 5/2011 | Klaiber et al. |

(Continued)

OTHER PUBLICATIONS

Turley, James L., "Chapter 9: 8086 Emulation", Advanced 80386 Programming Techniques, 1988, pp. 283-315, Osborne McGraw-Hill, Berkeley, CA, USA.

(Continued)

*Primary Examiner* — Shawn X Gu

(74) *Attorney, Agent, or Firm* — Meyertons Hood Kivlin Kowert and Goetzel PC; Rory D. Rankin

(57) ABSTRACT

Systems, apparatuses, and methods for implementing software control of state sets are disclosed. In one embodiment, a processor includes at least an execution unit and a plurality of state registers. The processor is configured to detect a command to allocate a first state set for storing a first state, wherein the command is generated by software, and wherein the first state specifies values for the plurality of state registers. The command is executed on the execution unit while the processor is in a second state, wherein the second state is different from the first state. The first state set of the processor is allocated with the first state responsive to executing the command on the execution unit. The processor is configured to allocate the first state set for the first state prior to the processor entering the first state.

20 Claims, 9 Drawing Sheets

(56) References Cited

U.S. PATENT DOCUMENTS

| | | |
|---|---|---|
| 10,037,267 B2 | 7/2018 | Breslow et al. |
| 2003/0217250 A1 | 11/2003 | Bennett et al. |
| 2004/0117532 A1 | 6/2004 | Bennett et al. |
| 2005/0198633 A1 | 9/2005 | Lantz et al. |

OTHER PUBLICATIONS

Gum, P.H., "System/370 Extended Architecture: Facilities for Virtual Machines", IBM Journal of Research and Development, Nov. 1983, pp. 530-544, vol. 27, No. 6.

Bauer, et al., "Legion: Expressing Locality and Independence with Logical Regions", GPU Technology Conference, 2012, 1 page, http://developer.download.nvidia.com/GTC/PDF/GTC2012/Posters/P0535_Legion_GTC_2012.pdf. [Retrieved Jul. 13, 2017].

Birrell, et al., "Implementing Remote Procedure Calls", ACM Transactions on Computer Systems, Feb. 1984, pp. 39-59, vol. 2, No. 1, ACM, New York, NY, USA.

Engler, et al., "Exokernel: An Operating System Architecture for Application-Level Resource Management", Proceedings of the Fifteenth ACM Symposium on Operating Systems Principles, Dec. 3, 1995, 16 pages, ACM, New York, NY, USA.

Hall, et al., "Mapping Irregular Applications to DIVA, a PIM-based Data-Intensive Architecture", Proceedings of the 1999 ACM/IEEE conference on Supercomputing, Jan. 1999, 18 pages, ACM, New York, NY, USA.

Kale, et al., "CHARM++: A Portable Concurrent Object Oriented System Based on C++", Proceedings of the 8th Annual Conference on Object-Oriented Programming Systems, Languages, and Applications, Oct. 1993, 18 pages, ACM, New York, NY, USA.

Kamruzzaman, et al., "Inter-core Prefetching for Multicore Processors Using Migrating Helper Threads", Proceedings of the Sixteenth International Conference on Architectural Support for Programming Languages and Operating Systems, Mar. 5, 2011, pp. 393-404, ACM, New York, NY, USA.

Lis, et al., "The Execution Migration Machine", MIT CSAIL CSG Technical Memo 511, Aug. 2013, 13 pages, http://csg.csail.mit.edu/pubs/memos/Memo-511/memo511.pdf. [Retrieved Jul. 13, 2017].

Nishtala, et al., "Scaling Communication-Intensive Applications on BlueGene/P Using One-Sided Communication and Overlap", Proceedings of the 2009 IEEE International Symposium on Parallel & Distributed Processing, May 23, 2009, pp. 1-12, IEEE Computer Society, Washington, D.C., USA.

"Chapter 5: One-Sided Communication", Sun HPC ClusterTools™ 6 Software Performance Guide, 2006, 16 pages, Sun Microsystems, Inc., https://docs.oracle.com/cd/E19061-01/hpc.cluster6/819-4134-10/1-sided.html#pgfld-999130. [Retrieved Jul. 13, 2017].

Von Eicken, et al., "Active Messages: a Mechanism for Integrated Communication and Computation", Proceedings of the 19th Annual International Symposium on Computer Architecture, May 1992, 20 pages, ACM, New York, NY, USA.

* cited by examiner

SOFTWARE CONTROL OF STATE SETS

BACKGROUND

Description of the Related Art

A graphics processing unit (GPU) includes one or more graphics pipelines for executing instructions of graphics applications. The output of a graphics pipeline is dependent on the state of the graphics pipeline. The state of a graphics pipeline includes various context-specific constants (e.g., texture handlers, shader constants, transform matrices). The ability to context switch processing hardware usually occurs at coarse granularity. Accordingly, improved techniques for managing processor states are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for controlling state sets from software are disclosed. In one embodiment, a system includes at least a processor and a memory. In one embodiment, the processor includes at least an execution unit and a plurality of state registers. In one embodiment, the processor is configured to detect a first command to allocate a first state set for storing a first state, wherein the first command is generated by software, and wherein the first state specifies an architectural state and values for the plurality of state registers. The processor executes the first command on the execution unit while the processor is in a second state, wherein the second state is different from the first state. The first state is stored in the first state set responsive to executing the first command on the execution unit.

In one embodiment, the processor is configured to detect and execute a second command for the processor to reserve the first state set, wherein the second command is generated by software. Reserving the first state set prevents the first state set from being modified by subsequent stores. In one embodiment, the processor is configured to detect a third command for using the first state, wherein the third command is generated by software. The third command is executed on the execution unit to load a plurality of values from the first state set into the plurality of state registers. In one embodiment, the processor is configured to detect a fourth command for the processor to free storage elements of the first state set, wherein the fourth command is generated by software. The fourth command is executed on the execution unit to mark the storage elements of the first state set as not allocated. The processor is then able to utilize the storage elements of the first state set for reserving and storing another state.

Figure 1:
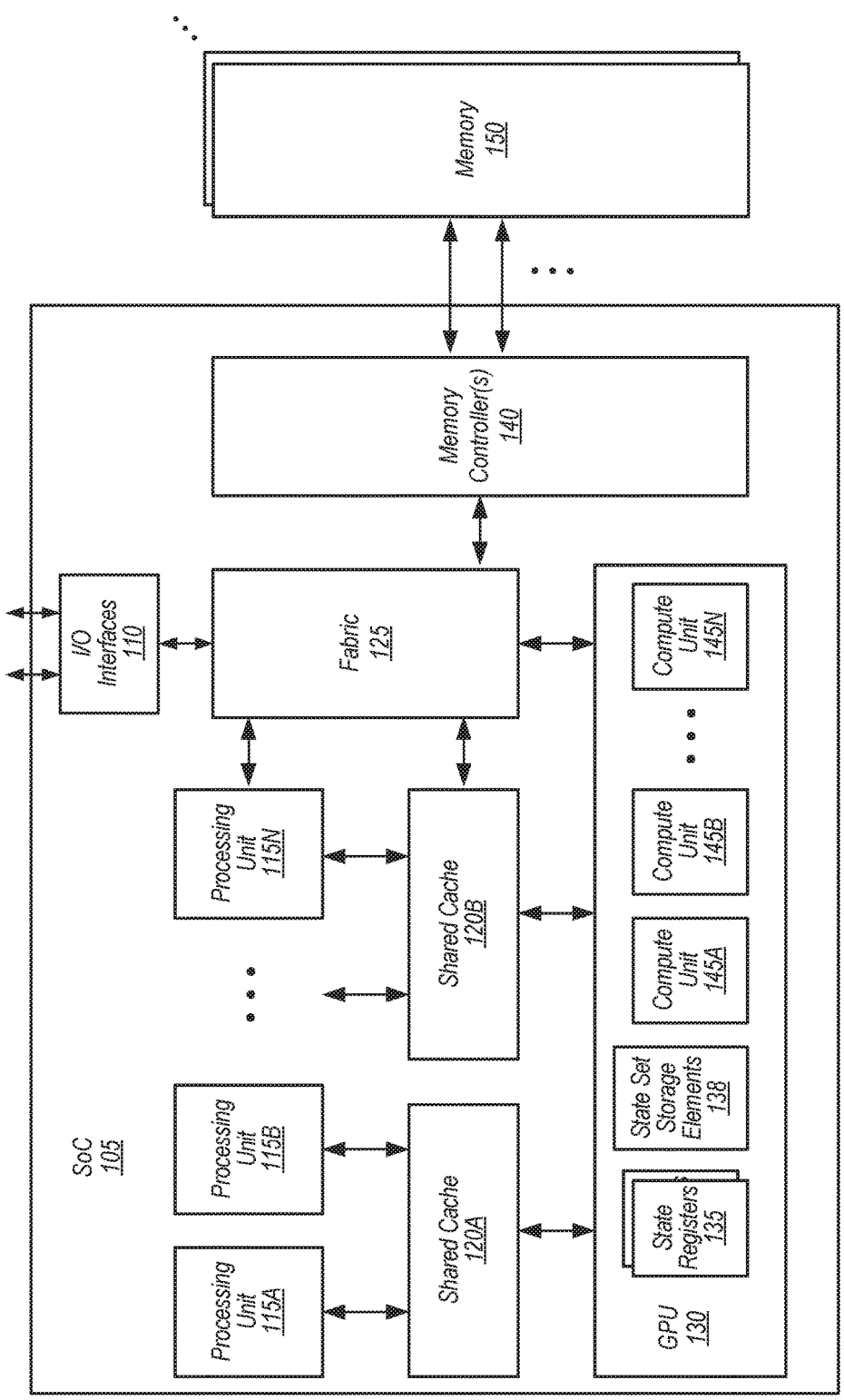
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 115A-N, input/output (I/O) interfaces 110, shared caches 120A-B, fabric 125, graphics processing unit 130 and memory controller(s) 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, one or more of processing units 115A-N are other types of processing units (e.g., application specific integrated circuit (ASIC), field programmable gate array (FPGA), digital signal processor (DSP)). Processing units 115A-N are coupled to shared caches 120A-B and fabric 125.

In one embodiment, processing units 115A-N are configured to execute instructions of a particular instruction set architecture (ISA). Each processing unit 115A-N includes one or more execution units, cache memories, schedulers, branch prediction circuits, and so forth. In one embodiment, the processing units 115A-N are configured to execute the main control software of system 100, such as an operating system. Generally, software executed by processing units 115A-N during use can control the other components of system 100 to realize the desired functionality of system 100. Processing units 115A-N can also execute other software, such as application programs.

GPU 130 includes state registers 135, state set storage elements 138, and compute units 145A-N which are representative of any number and type of compute units that are used for graphics or general-purpose processing. GPU 130 is coupled to shared caches 120A-B and fabric 125. In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations. In one embodiment, the output of operations executed by GPU 130 is dependent on a current architectural state of compute units 145A-N. In one embodiment, the architectural state is based on the values of various context-specific constants such as texture handlers, shader constants, transform matrices, and so forth which are stored in state registers 135.

In one embodiment, GPU 130 is configured to switch its current state of execution to one of the architectural states specified in the state sets stored in state set storage elements 138. Each state set stores values indicative of a respective architectural state for GPU 130. By using locally stored state set storage elements 138, GPU 130 is able to perform a context switch to a stored state without accessing external memory.

In one embodiment, GPU 130 is configured to allocate and reserve a state set without changing its current state of execution. For example, GPU 130 is configured to detect a software request to allocate a state set of state set storage elements 138. In one embodiment, GPU 130 receives a request to allocate a state set for a first state while GPU 130 is currently in a second state based on the values in state registers 135. Without switching out of the second state, GPU 130 stores values of the first state in one of the state sets. Then, a software command is generated and executed by GPU 130 to reserve the given state set, which prevents the given state set from being modified by subsequent stores. Later, a software command for using the first state is detected by GPU 130, and GPU 130 loads the values from the corresponding state set into state registers 135 to enter the first state. Depending on the embodiment, the software commands for allocating, reserving, and using a state set are generated by a user application, a user mode driver, or another software application.

I/O interfaces 110 are coupled to fabric 125, and I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 115A-N and/or compute units 145A-N. In some embodiments, SoC 105 includes shared caches 120A-B that are utilized by processing units 115A-N and compute units 145A-N. In one embodiment, caches 120A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
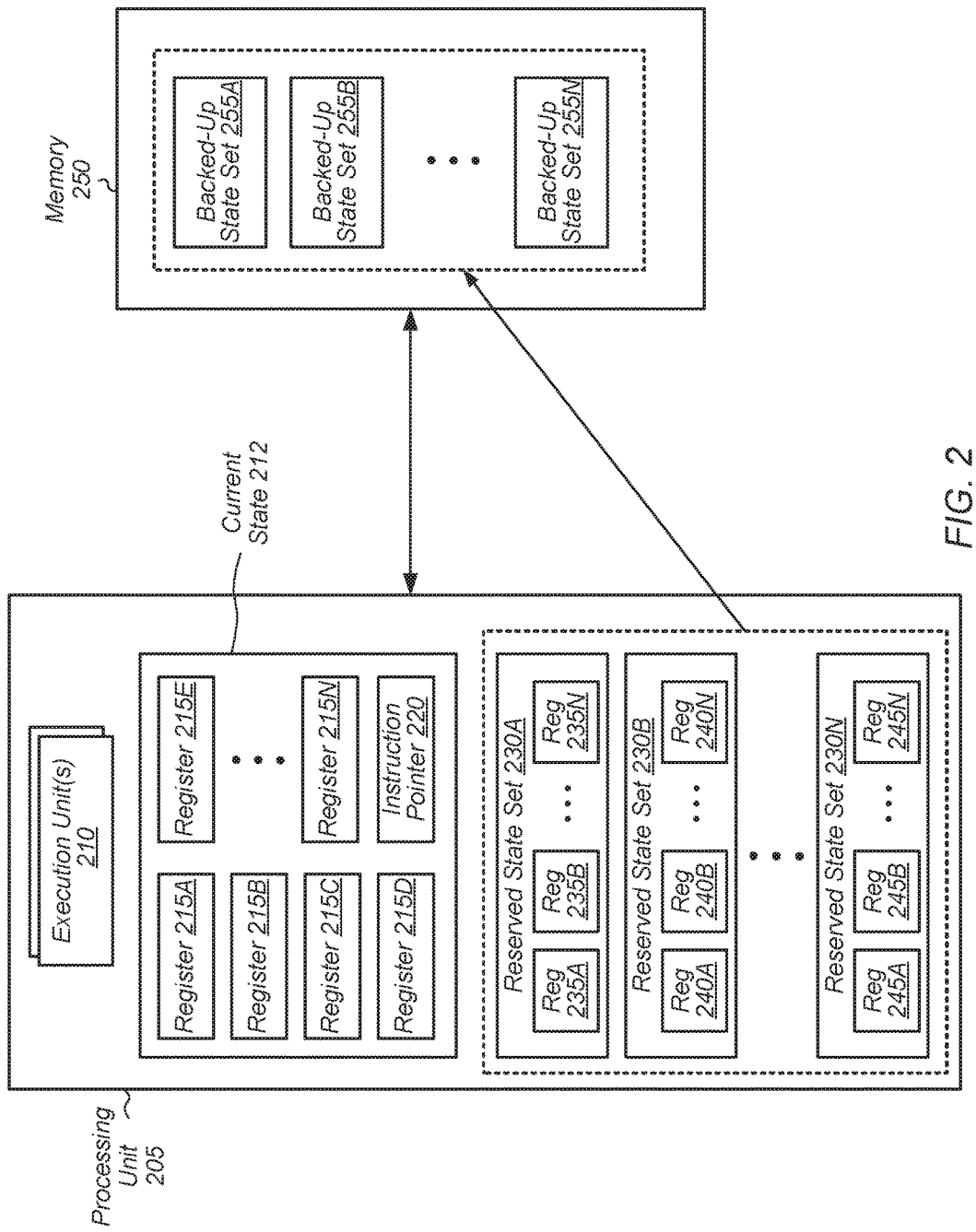
FIG. 2 is a block diagram of one embodiment of a processing unit coupled to a memory.

Turning now to FIG. 2, a block diagram of one embodiment of a processing unit 205 coupled to a memory 250 is shown. Processing unit 205 includes current state 212 which represents the current architectural state of processing unit 205. Current state 212 includes registers 215A-N, which are representative of any number and type (e.g., general purpose register) of state registers, and instruction pointer 220. It is noted that current state 212 can also include other variables and other values which define the current architectural state of processing unit 205. It is also noted that a "state" of a processing unit can also be referred to as a "context" of the processing unit herein. In one embodiment, processing unit 205 is a GPU (e.g., GPU 130 of FIG. 1). In other embodiments, processing unit 205 can be other types of processing units. It is noted that the terms "processing unit" and "processor" are utilized interchangeably herein.

Processing unit 205 also includes one or more execution units 210 which can also be referred to as compute units. In one embodiment, execution units 210 include different types of execution units, including a command processor, shader processors, graphics pipelines, and/or other types of processors. In one embodiment, processing unit 205 detects a command for allocating a first state set of processing unit 205, with the command generated by software. In one embodiment, execution unit 210 executes a single command for allocating a first state set and storing a first state in the first state set of processing unit 205, where the first state includes a plurality of register values specifying an architectural state of processing unit 205. In one embodiment, the single command initiates microcode for performing a plurality of operations to store the first state in the first state set. In one embodiment, the first state set is reserved in a plurality of storage elements which are located within processing unit 205.

In one embodiment, processing unit 205 includes on-chip storage for any number of reserved state sets 230A-N. Software executing on processing unit 205 or another processing unit (e.g., CPU) coupled to processing unit 205 is able to execute commands to allocate, reserve, use, and free reserved state sets 230A-N. A reserved state set 230A can be reserved after values indicative of an architectural state by software are stored in the state set 230A and prior to the architectural state being used for the first time by processing unit 205. In one embodiment, reserved state sets 230A-N are backed up to memory 250. These memory backed states are shown as backed-up state sets 255A-N within memory 250.

Figure 3:
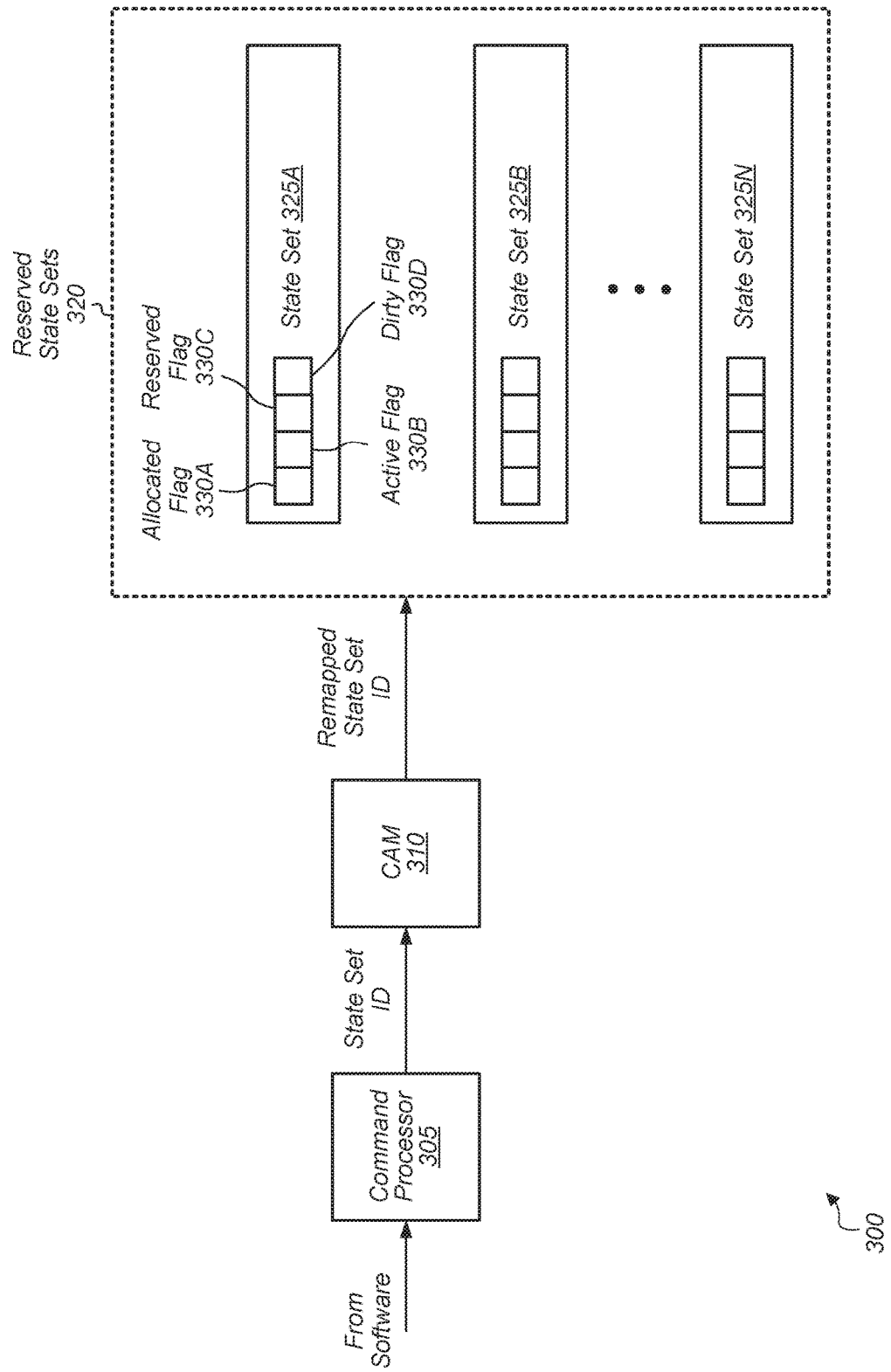
FIG. 3 is a block diagram of one embodiment of logic for processing state set reservation commands received from software.

Referring now to FIG. 3, a block diagram of one embodiment of logic 300 for processing state set reservation commands received from software is shown. In one embodiment, logic 300 is included in a processing unit (e.g., processing unit 205 of FIG. 2) for receiving and processing commands received from software for allocating, reserving, using, and freeing reserved state sets 320. In one embodiment, the commands include at least an allocate command, a reserve command, a use command, and a free command for allocating, reserving, using, and freeing, respectively, an identified state set of reserved state sets 320.

In one embodiment, commands from software are received and executed by command processor 305. These commands include draw commands, state set allocation commands, state set reservation commands, state set use commands, state set free commands, and other commands. In one embodiment, commands are received from an application, a user-mode driver, or other user software. For a command which targets one of the reserved state sets 320, the command includes a state set identifier (ID) to identify the targeted reserved state set 320. In one embodiment, a content addressable memory (CAM) 310 is utilized to remap the state set ID of a given software command to the actual state set ID utilized to identify a given state set 325A-N of reserved state sets 320.

In one embodiment, each state set 325A-N includes multiple flags to indicate the status of the state set. For example, as shown in FIG. 3, state set 325A includes allocated flag 330A, active flag 330B, reserved flag 330C, and dirty flag 330D. Each of the other state sets 325B-N also include these flags. In other embodiments, state sets 325A-N can include other numbers and types of flags to indicate the status of state sets 325A-N. In one embodiment, allocated flag 330A indicates if state set 325A is currently storing a state set that has been allocated by software or if the state set is available for reservation. Active flag 330B indicates if state set 325A stores the current state of the host processor (e.g., processing unit 205). Reserved flag 330C indicates if state set 325A has been reserved to prevent modification. Dirty flag 330C indicates if changes made to state set 325A have not yet been backed up to memory.

When the processor detects a command for allocating a state set, the processor checks to see if any of the state sets are free (i.e., not allocated). If no state sets are free, then the processor stalls or generates a fault. If there is a free state set, then the processor executes the allocate command to store values in the storage elements of the free state set. Then, the processor sets the allocated flag and the dirty flag for this state set, and the processor generates a mapping for the software state ID to the hardware state ID and stores the mapping in CAM 310. If the processor detects a command for reserving the state set, then the processor sets the reserved flag for the state set which prevents subsequent modifications. At a later point in time, if the processor detects a use command targeting the state set (based on the mapping in CAM 310), the processor loads the state registers with the values from the state set and then sets the active flag for the state set. When the processor detects a free command for the reserved state set, the processor can clear the allocated flag and reserved flag for the state set to indicate that this state set can be utilized for a new allocation.

Figure 4:
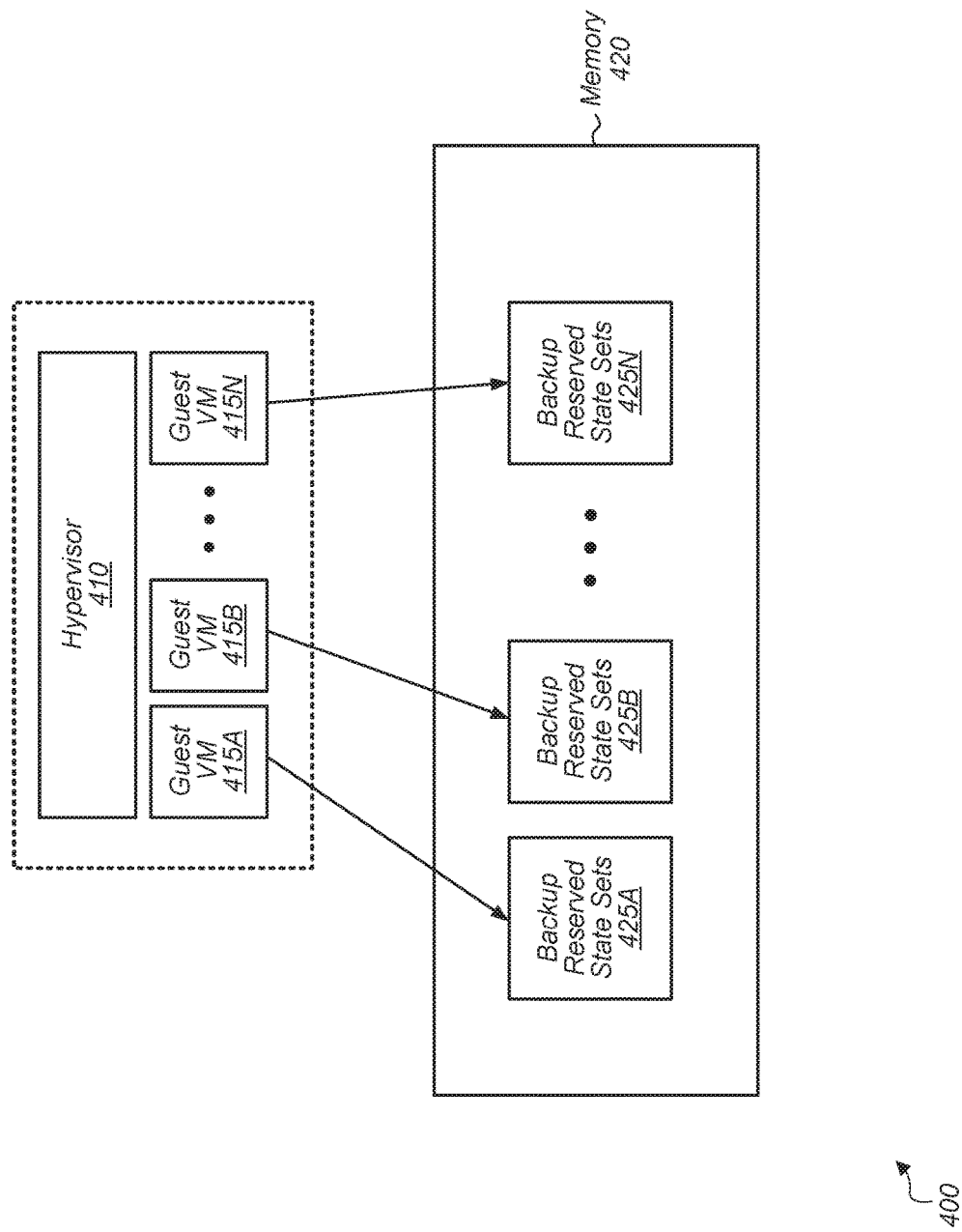
FIG. 4 is a block diagram of one embodiment of a virtualization environment.

Turning now to FIG. 4, a block diagram of one embodiment of a virtualization environment 400 is shown. Virtualization environment 400 includes hypervisor 410 and guest virtual machines (VMs) 415A-N, which are representative of any number and type of VMs. Hypervisor 410 is configured to provide the virtualization for each of the guest VMs 415A-N. Accordingly, hypervisor 410 allocates physical resources of the host computing system (e.g., system 100 of FIG. 1) to guest VMs 415A-N. Hypervisor 410 is also configured to schedule guest VMs 415A-N on the physical hardware of the host computing system.

Generally, virtualization of a processor or computer system includes providing one or more privileged programs with access to a guest VM over which the privileged program has full control, but the control of the physical machine is retained by hypervisor 410. The guest VM includes one or more processors, memory, and various peripheral devices that the privileged program expects to find in the machine on which it is executing. The virtual machine elements are implemented by hardware that the hypervisor allocates to the virtual machine, at least temporarily, and/or is emulated in software. As used herein, a "guest VM" or a "guest" is defined as one or more software applications that are to be virtualized for execution on a host computer system.

In one embodiment, each guest VM 415A-N includes multiple reserved state sets for transitioning between current operating architectural states of the host processor(s). The multiple reserved state sets are stored in on-chip storage within the host processor(s) of the physical hardware when a given guest VM is active. When a given guest VM exits, the multiple reserved state sets are backed up to memory 420. For example, guest VM 415A stores its reserved state sets as backup reserved state sets 425A, guest VM 415B stores its reserved state sets as backup reserved state sets 425B, and guest VM 415N stores its reserved state sets as backup reserved state sets 425N. When a given guest VM resumes execution on the physical hardware, then the backup reserved state sets stored in memory 420 are restored to the on-chip storage on the processor(s). This allows the applications of each guest VM to utilize instructions for allocating, reserving, using, and freeing the multiple state sets.

Figure 5:
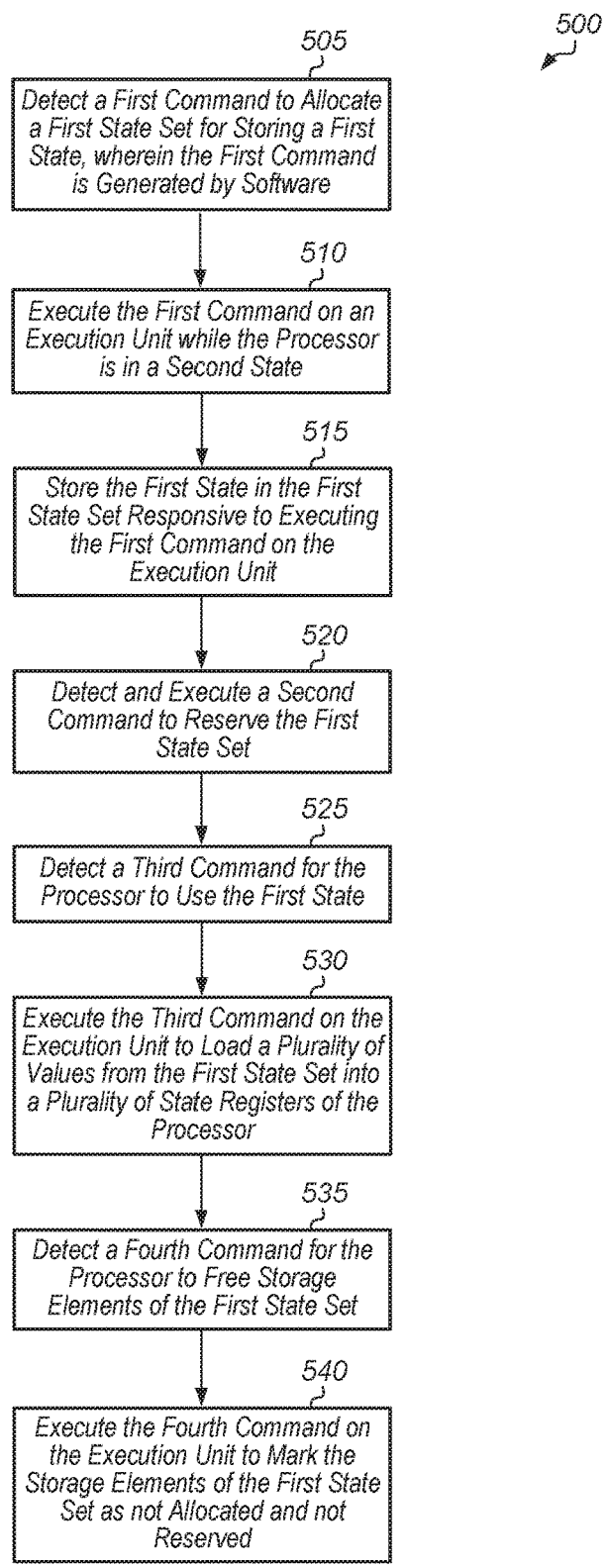
FIG. 5 is a generalized flow diagram illustrating one embodiment of a method for implementing software control of state sets.
Figure 6:
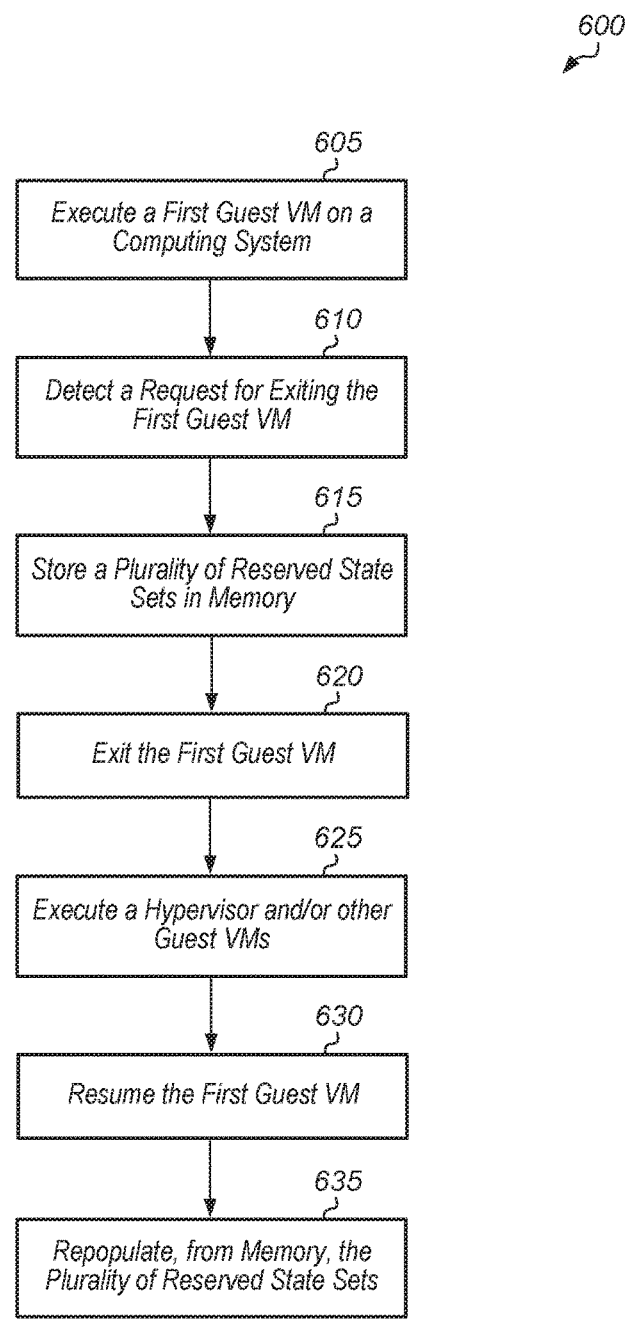
FIG. 6 is a generalized flow diagram illustrating one embodiment of a method for executing guest virtual machines.
Figure 7:
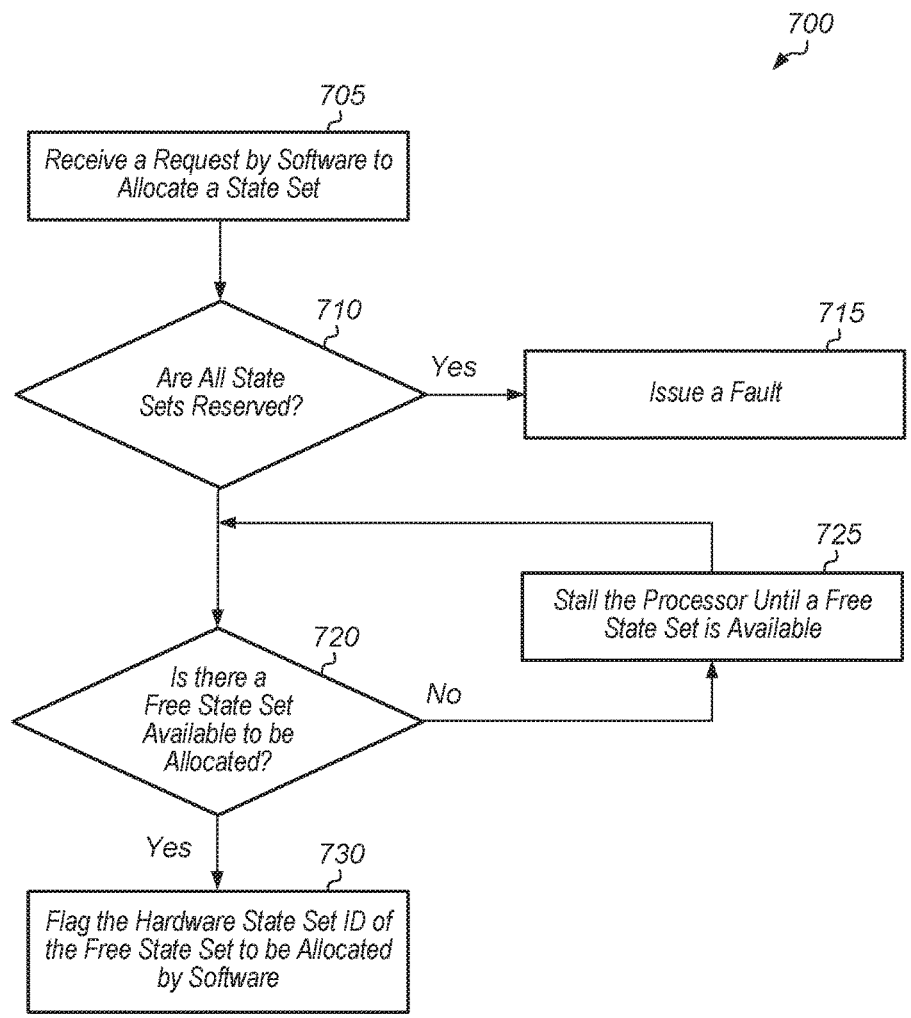
FIG. 7 is a generalized flow diagram illustrating one embodiment of a method for allocating a state set.
Figure 8:
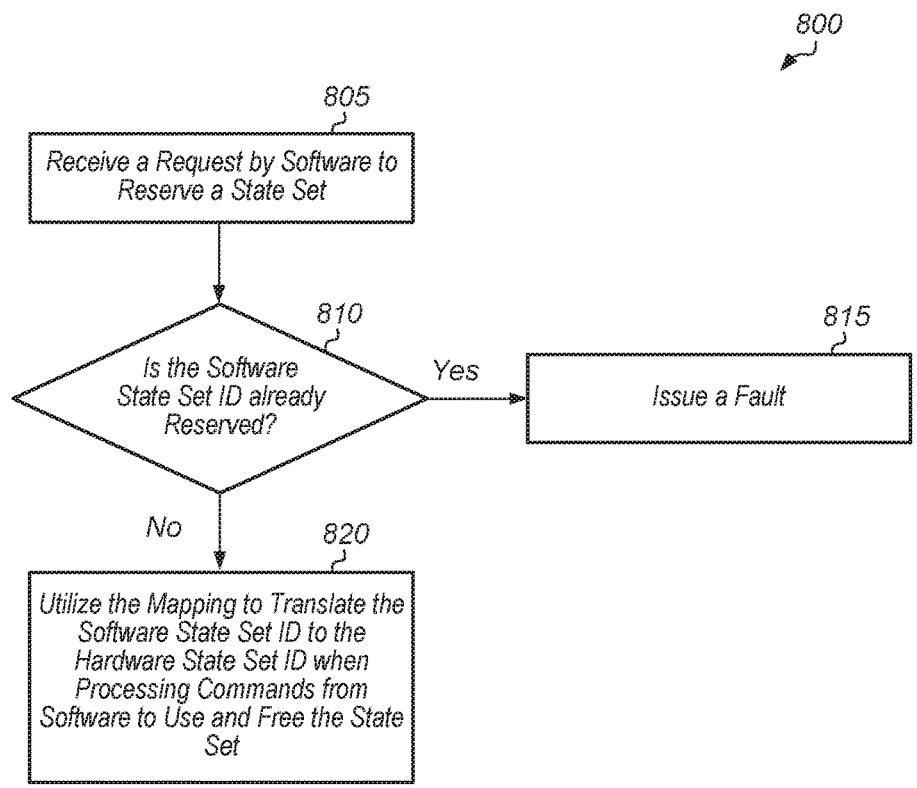
FIG. 8 is a generalized flow diagram illustrating one embodiment of a method for reserving a state set.

Referring now to FIG. 5, one embodiment of a method 500 for implementing software control of state sets is shown. For purposes of discussion, the steps in this embodiment and those of FIGS. 6-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A processor detects a first command to allocate a first state set for storing a first state, where the first command is generated by software (block 505). In one embodiment, the first command is generated by a user application. It is noted that the term "command" can also be referred to as an "instruction" or an "operation". In one embodiment, the first state specifies values for a plurality of state registers of the processor, with the values defining an architectural state of the processor.

Next, the processor executes the first command on an execution unit while the processor is in a second state (block 510). It is assumed for the purposes of this discussion that the second state is a different architectural state from the first state. It is also assumed for the purposes of this discussion that there is a non-reserved and non-active state set for storing the values of the first state. If all state sets are either reserved or active, then in one embodiment, the processor stalls until a state set becomes available for allocation. Then, the first state is stored in the first state set responsive to executing the first command on the execution unit (block 515). In one embodiment, the first state set of the processor includes storage elements located within the processor. After the first state is stored in the first state set, the processor detects and executes a second command to reserve the first state set (block 520). Reserving the first state set prevents the first state set from being modified. At a later point in time, the processor detects a third command for the processor to use the first state (block 525). In response to detecting the third command, the processor executes the third command on the execution unit to load a plurality of values from the first state set into the plurality of state registers of the processor (block 530).

At a later point in time, the processor detects a fourth command for the processor to free storage elements of the first state set (block 535). In one embodiment, the second, third, and fourth commands are generated by software. Next, in response to detecting the fourth command, the processor executes the fourth command on the execution unit to mark the storage elements of the first state set as not allocated and not reserved (block 540). By marking the storage elements of the first state set as not allocated and not reserved, the first state set can be re-allocated and programmed with new values. After block 540, method 500 ends. It is noted that method 500 can be performed multiple times for multiple different state sets that are being allocated. Accordingly, in one embodiment, the processor includes storage elements for storing multiple reserved state sets at any given time.

Turning now to FIG. 6, one embodiment of a method 600 for executing guest virtual machines is shown. A first guest virtual machine (VM) executes on a computing system (block 605). In one embodiment, the first guest VM includes a plurality of reserved state sets stored in on-chip memory of a first processor of the computing system. Next, a request for exiting the first guest VM is detected (block 610). Prior to exiting the first guest VM, the plurality of reserved state sets are stored in memory (block 615). Then, the first guest VM exits (block 620).

Next, a hypervisor and/or other guest VMs execute on the computing system (block 625). At a later point in time, the first guest VM resumes execution (block 630). In response to resuming the first guest VM, the plurality of reserved state sets are repopulated from memory (block 635). After block 635, method 600 ends.

Referring now to FIG. 7, one embodiment of a method 700 for allocating a state set is shown. A processor detects a request by software to allocate a state set, wherein the request includes a software state set ID (block 705). Next, the processor determines if all state sets are reserved (conditional block 710). If all state sets are reserved (conditional block 710, "yes" leg), then the processor issues a fault (block 715). If not all of the state sets are reserved (conditional block 710, "no" leg), then the processor determines if there is a free state set available to be allocated (conditional block 720). If there is not a free state set available to be allocated (conditional block 720, "no" leg), then the processor stalls until a free state set is available (block 725) and then method 700 returns to conditional block 720. If there is a free state set available to be allocated (conditional block 720, "yes" leg), then the processor flags the hardware state set ID of the free state set to be allocated (block 730). In one embodiment, software generates and stores a mapping of the software state set ID to a hardware state set ID of the free state set when the free state set is allocated. In another embodiment, software generates and stores a mapping of the software state set ID to a hardware state set ID of the free state set when the free state set is reserved. In one embodiment, the mapping of the software state set ID to a hardware state set ID is stored in a content address memory (CAM). After blocks 715 and 730, method 700 ends.

Turning now to FIG. 8, one embodiment of a method 800 for reserving a state set is shown. A processor detects a request by software to reserve a state set, wherein the request includes a software state set ID (block 805). Next, the processor determines if the software state set ID is already reserved (conditional block 810). If the software state set ID is already reserved (conditional block 810, "yes" leg), then the processor issues a fault (block 815). If the software state set ID is not already reserved (conditional block 810, "no" leg), then the processor utilizes the mapping to translate the software state set ID to the hardware state set ID when processing commands from software to use and free the state set (block 820). After blocks 815 and 820, method 800 ends.

Figure 9:
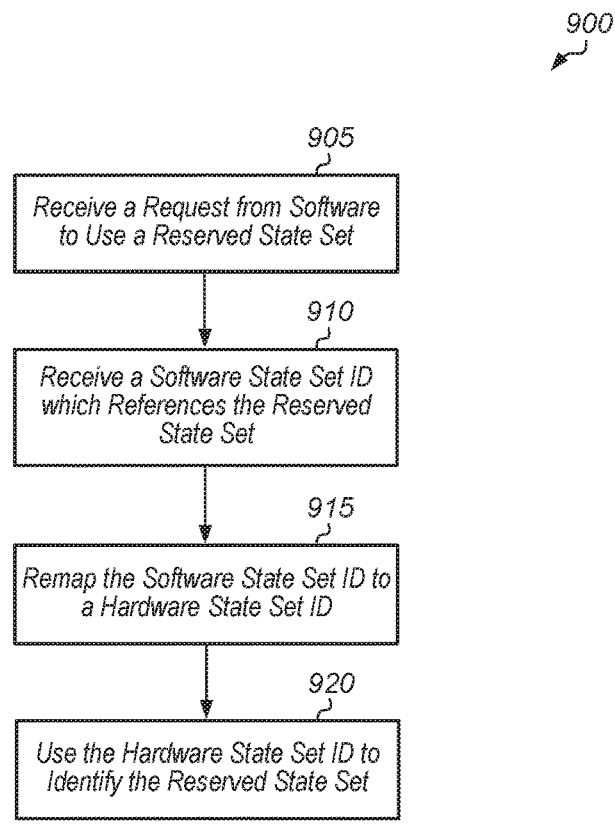
FIG. 9 is a generalized flow diagram illustrating one embodiment of a method for using a reserved state set.

Turning now to FIG. 9, one embodiment of a method 900 for using a reserved state set is shown. A processor receives a request from software to use a reserved state set (block 905). As part of the request, the processor receives a software state set ID which references the reserved state set (block 910). Next, the processor remaps the software state set ID to a hardware state set ID (block 915). Then, the processor uses the hardware state set ID to identify the reserved state set (block 920). After block 920, method 900 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   an execution unit; and
   a plurality of state registers;
   wherein the processor is configured to:
      detect a first command to allocate a first state set for storing a first state, wherein the first command is generated by software and the first state specifies values for the plurality of state registers;
      execute the first command on the execution unit while the processor is in a second state, wherein the second state is different from the first state; and
      store the first state in the first state set responsive to executing the first command on the execution unit.

2. The processor as recited in claim 1, wherein the processor is configured to allocate the first state set prior to the processor entering the first state.

3. The processor as recited in claim 1, wherein the processor is configured to detect and execute a second command to reserve the first state set to prevent the first state set from being modified.

4. The processor as recited in claim 3, wherein the processor is configured to:
   detect a third command for the processor to use the first state, wherein the second command is generated by software;
   execute the third command on the execution unit to load a plurality of values from the first state set into the plurality of state registers.

5. The processor as recited in claim 4, wherein the processor is configured to:
  detect a fourth command for the processor to free storage elements storing the first state set, wherein the third command is generated by software;
  execute the fourth command on the execution unit to mark the storage elements storing the first state set on a second processor as not allocated and not reserved.

6. The processor as recited in claim 1, wherein the first command is generated by a user application.

7. The processor as recited in claim 1, wherein the processor is further configured to backup the first state set to a memory.

8. A method comprising:
  detecting a first command to allocate a first state set for storing a first state, wherein the first command is generated by software, and wherein the first state specifies values for a plurality of state registers;
  executing the first command on a processor while the processor is in a second state, wherein the second state is different from the first state; and
  storing the first state in the first state set responsive to executing the first command on the processor.

9. The method as recited in claim 8, further comprising allocating the first state set prior to the processor entering the first state.

10. The method as recited in claim 8, further comprising detecting and executing a second command to reserve the first state set to prevent the first state set from being modified.

11. The method as recited in claim 10, further comprising:
  detecting a third command for the processor to use the first state, wherein the second command is generated by software;
  executing the third command on the processor to load a plurality of values from the first state set into the plurality of state registers.

12. The method as recited in claim 11, further comprising:
  detecting a fourth command for the processor to free storage elements storing the first state set, wherein the third command is generated by software;
  executing the fourth command on the processor to mark the storage elements storing the first state set on a second processor as not allocated and not reserved.

13. The method as recited in claim 8, wherein the first command is generated by a user application.

14. The method as recited in claim 8, further comprising backing up the first state set to a memory.

15. A system comprising:
  a memory; and
  a processor coupled to the memory;
  wherein the system is configured to:
    detect a first command to allocate a first state set for storing a first state, wherein the first command is generated by software, and wherein the first state specifies values for a plurality of state registers;
    execute the first command on a processor while the processor is in a second state, wherein the second state is different from the first state; and
    store the first state in the first state set responsive to executing the first command on the processor.

16. The system as recited in claim 15, wherein the processor is configured to allocate the first state set prior to the processor entering the first state.

17. The system as recited in claim 15, wherein the processor is configured to detect and execute a second command to reserve the first state set to prevent the first state set from being modified.

18. The system as recited in claim 17, wherein the processor is configured to:
  detect a third command for the processor to use the first state, wherein the second command is generated by software;
  execute the third command on the processor to load a plurality of values from the first state set into the plurality of state registers.

19. The system as recited in claim 18, wherein the processor is configured to:
  detect a fourth command for the processor to free storage elements storing the first state set, wherein the third command is generated by software;
  execute the fourth command on the processor to mark the storage elements storing the first state set on a second processor as not allocated and not reserved.

20. The system as recited in claim 15, wherein the first command is generated by a user application.

* * * * *